Sept. 2, 1924.
W. J. VICKERS
RODENT TRAP
Filed Dec. 8, 1921
1,507,532
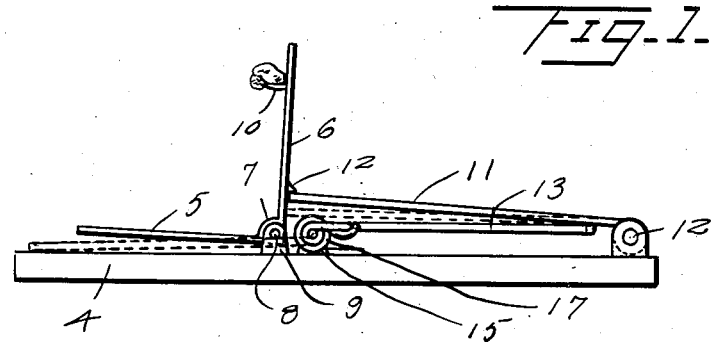
Fig. 1.
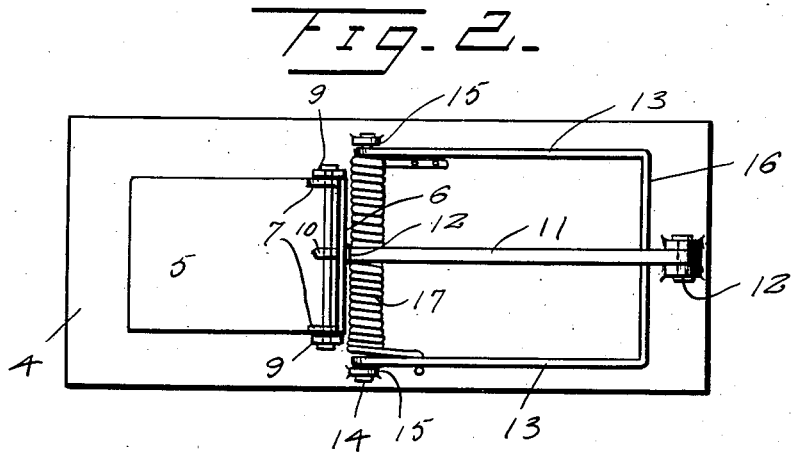
Fig. 2.
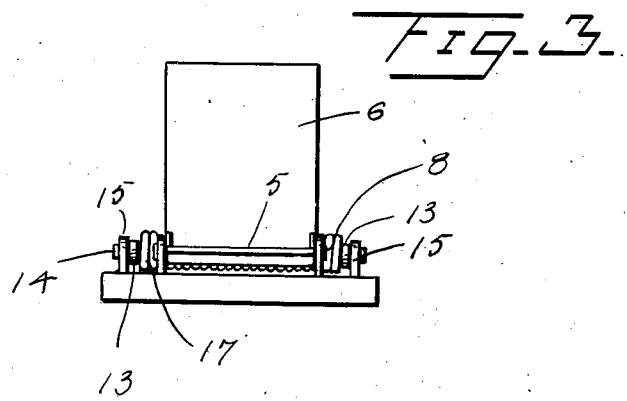
Fig. 3.
Inventor
W. J. Vickers
Attorney Patented Sept. 2, 1924.

1,507,532

UNITED STATES PATENT OFFICE.

WALLACE J. VICKERS, OF LOGAN, UTAH.

RODENT TRAP.

Application filed December 8, 1921. Serial No. 520,892.

*To all whom it may concern:*

Be it known that I, WALLACE J. VICKERS, a citizen of the United States, residing at Logan, in the county of Cache and State of Utah, have invented certain new and useful Improvements in Rodent Traps; and I do hereby declare the following to be a full, clear, and exact description of the invention, such as will enable others skilled in the art to which it appertains to make and use the same.

This invention relates to an animal trap particularly designed to catch rodents such as mice although capable of variation in size to catch any animal desired.

A particular object is to provide a trap having a bait-retaining means so disposed as to be freely in view of the animal but incapable of being reached by it.

Another important object is to provide such a trap having a setting member, trip and bait holder capable of manufacture in a single piece, of metal, and expeditiously and to enable manufacture at exceedingly low cost and to be more durable in use, and particularly to avoid the use of wooden parts which are more expensive in manufacture and assembly and less durable in use.

Additional objects and advantages will become apparent from a consideration of the description hereinafter following taken in connection with the accompanying drawings illustrating one preferred embodiment wherein:—

Figure 1 is a side elevation of the trap in a set position, the operating parts shown as sprung in a dotted line position;

Figure 2 is a plan view of the trap in a set position, and

Figure 3 is an end elevation.

Like reference characters designate like or similar parts throughout the views.

In reducing the invention to practice, a suitable base is provided which may be a wooden block as at 4. A trip or tilting platform 5 is provided with a plate 6, integral therewith, which extends upwardly, substantially at a right angle. At the junction of the trip platform or plate 5 and the plate 6 ears 7 are provided integral therewith through which a pivot rod 8 passes, being journaled in bearings or the like 9 secured to the base 4. It is to be understood that in lieu of the lugs or ears 7, any suitable means may be employed for securing the pivot rod 8 to plates 5 and 6.

Adjacent the top of the plate 6 a bait holder 10 is provided integral therewith.

In order to normally maintain the plate 5 inclined or spaced above the base 4 when the trap is set, a detent rod 11 is provided to cooperate with a notch or shoulder 12 in the rear of plate 6 which is pivoted at 12ª for vertical movement, on the base 4. A substantially U-shaped attaching frame is provided having side arms 13 pivoted at 14 in lugs 15 rising from the base 4. Arms 13 are joined by a bridge arm 16 adapted to contact with the under surface of the detent rod 11. Surrounding the rod 14 is a coil spring 17 cooperating with the arms 13 and base 4 to urge the frame from the position shown in full lines in Figure 1 to the position shown in dotted lines in the same figure.

In operation, with bait in place on the holder 10, a mouse or other rodent in an endeavor to reach the bait will tread upon the platform 5 and its weight will tilt said platform moving it at the free end toward the base 4, thus releasing the detent 11 from the shoulder 12, whereupon the tension spring 17 will cause the frame 13—16 to fly upwardly, moving the detent 11 from its path, and assuming the dotted line position shown in Figure 1, thus striking the animal during its travel and clamping it securely intermediate the frame and the base 4.

It is to be understood that I have shown merely one embodiment whereby my invention may be practiced in view of which fact changes may be made within the spirit and scope.

What is claimed is:—

A trap having a catching frame, a spring to urge movement thereof, a detent for said frame, plates integral with and substantially at a right angle to each other, means integral with one of the plates providing a shoulder engageable by said detent, a bait holding means integral with the last mentioned plate and on the opposite side thereof to said shoulder, the other plate constituting a trip, ears integral with both of said plates and connected to both of said plates and extending inwardly from the junction of said plates, a pivot rod extending through said ears, and a base mounting said pivot rod and with respect to which the trip plate is normally angularly disposed.

In testimony whereof I affix my signature in presence of two witnesses.

WALLACE J. VICKERS.

Witnesses:
JESSE P. RICH,
JAS. H. STEWART.